United States Patent
Tanibata

(10) Patent No.: US 12,291,095 B2
(45) Date of Patent: May 6, 2025

(54) VEHICULAR DEVICE FOR SYNCHRONIZING MULTIPLE SURFACES INDIVIDUALLY DRAWN ON DIFFERENT PHYSICAL SURFACES AND CONTROL METHOD FOR VEHICULAR DEVICE FOR SYNCHRONIZING MULTIPLE SURFACES INDIVIDUALLY DRAWN ON DIFFERENT PHYSICAL SURFACES

(71) Applicant: DENSO CORPORATION, Kariya (JP)

(72) Inventor: Nobuhiko Tanibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 706 days.

(21) Appl. No.: 17/498,823

(22) Filed: Oct. 12, 2021

(65) Prior Publication Data

US 2022/0024315 A1 Jan. 27, 2022

Related U.S. Application Data

(63) Continuation of application No. PCT/JP2020/014557, filed on Mar. 30, 2020.

(30) Foreign Application Priority Data

Apr. 16, 2019 (JP) ................. 2019-077775

(51) Int. Cl.
*B60W 50/00* (2006.01)
*B60K 35/00* (2006.01)
*B60W 50/14* (2020.01)

(52) U.S. Cl.
CPC ............ *B60K 35/00* (2013.01); *B60W 50/14* (2013.01); *B60W 2050/146* (2013.01)

(58) Field of Classification Search
None
See application file for complete search history.

(56) References Cited

U.S. PATENT DOCUMENTS

2013/0031552 A1* 1/2013 Kato ................... G06F 9/45558
718/1
2014/0049548 A1 2/2014 Rao et al.
(Continued)

FOREIGN PATENT DOCUMENTS

JP 2009176228 A 8/2009
JP 2009245265 A 10/2009
(Continued)

OTHER PUBLICATIONS

U.S. Appl. No. 17/498,885, filed Oct. 12, 2021, Tanibata.
U.S. Appl. No. 17/498,930, filed Oct. 12, 2021, Tanibata.

*Primary Examiner* — Martin Mushambo
(74) *Attorney, Agent, or Firm* — Harness, Dickey & Pierce, P.L.C.

(57) ABSTRACT

A vehicular device capable of providing multiple contents with one user interface includes a synchronization unit configured to synchronize multiple surfaces drawn on multiple physical surfaces different from each other. The synchronization unit loads in the surface drawn on a different physical surface that is different from the physical surface allocated to the synchronization unit, and synchronizes the surface drawn by the synchronization unit and the surface drawn on the different physical surface by processing the surface that is loaded in as the surface drawn by the synchronization unit.

11 Claims, 13 Drawing Sheets

(56) References Cited

U.S. PATENT DOCUMENTS

| | | |
|---|---|---|
| 2016/0203580 A1 | 7/2016 | Rao et al. |
| 2016/0314077 A1 | 10/2016 | Rao et al. |
| 2018/0174349 A1 | 6/2018 | Yang et al. |
| 2018/0286053 A1* | 10/2018 | Labbe ................ H04N 21/4781 |
| 2019/0114267 A1 | 4/2019 | Rao et al. |

FOREIGN PATENT DOCUMENTS

| | | |
|---|---|---|
| JP | 2010026297 A | 2/2010 |
| JP | 2016097928 A | 5/2016 |
| JP | 2017523499 A | 8/2017 |
| JP | 2017208124 A | 11/2017 |

* cited by examiner

PHYSICAL SURFACE (A)
(METER APPLICATION)

PHYSICAL SURFACE (B)
(NAVIGATION APPLICATION)

PHYSICAL SURFACE (C)
(SAFETY APPLICATION)

PHYSICAL SURFACE (D)
(VIDEO APPLICATION)

PHYSICAL SURFACE (E)
(HUD APPLICATION)

COMPARATIVE EXAMPLE: SEQUENCE

COMPARATIVE EXAMPLE: SCREEN TRANSITION

NAVIGATION DISPLAY MODE

SYNCHRONIZATION DEVIATION STATE

SYNCHRONIZATION STATE

VEHICULAR DEVICE FOR SYNCHRONIZING MULTIPLE SURFACES INDIVIDUALLY DRAWN ON DIFFERENT PHYSICAL SURFACES AND CONTROL METHOD FOR VEHICULAR DEVICE FOR SYNCHRONIZING MULTIPLE SURFACES INDIVIDUALLY DRAWN ON DIFFERENT PHYSICAL SURFACES

CROSS REFERENCE TO RELATED APPLICATIONS

The present application is a continuation application of International Patent Application No. PCT/JP2020/014557 filed on Mar. 30, 2020, which designated the U.S. and claims the benefit of priority from Japanese Patent Application No. 2019-077775 filed on Apr. 16, 2019. The entire disclosures of all of the above applications are incorporated herein by reference.

TECHNICAL FIELD

The present disclosure relates to a vehicular device and a control method for a vehicular device.

BACKGROUND

There has been known a vehicular device in which multiple contents are provided with one user interface.

SUMMARY

The present disclosure provides a vehicular device and a control method for a vehicular device in which multiple surfaces drawn on different physical surfaces are synchronized.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
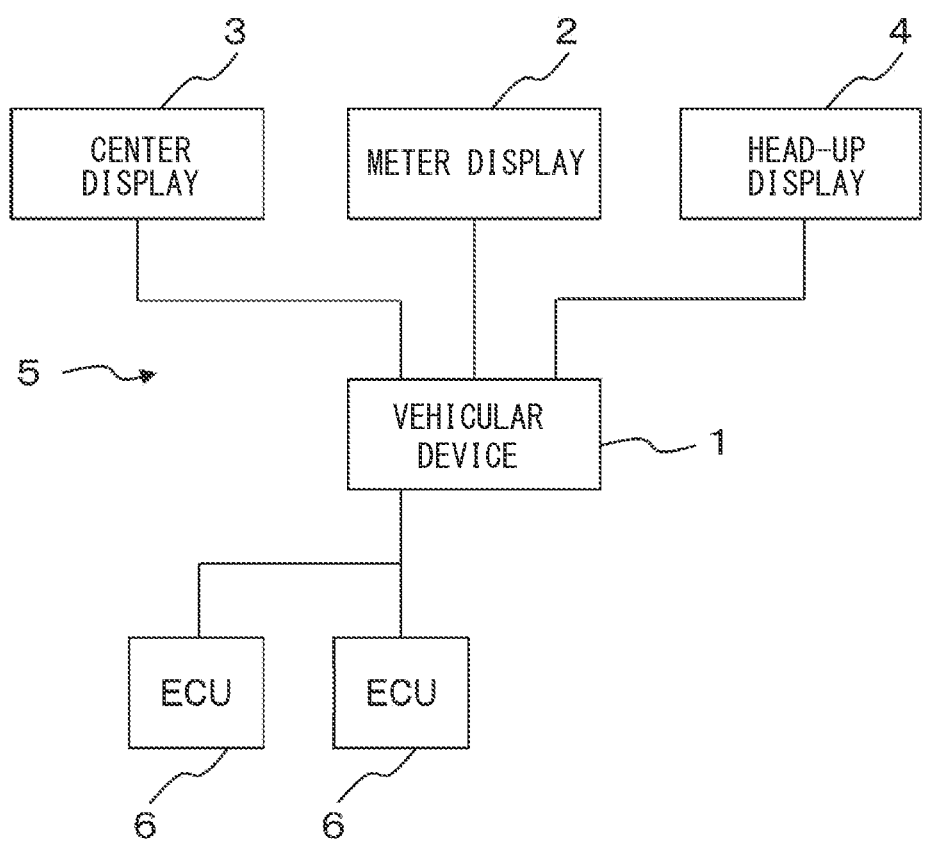
FIG. 1 is a diagram showing a configuration example of a cockpit system in a first embodiment.

In a vehicular device, multiple contents may be provided with one user interface. At this time, the provided contents may be generated by different application programs, different multiple operating systems, or different units.

The contents may be displayed by drawing surfaces on physical surfaces, such as memories, and composing the drawn surfaces in hardware. Note that the surface is, in brief, the image data that is a source of a content image being displayed at a certain moment. A subject that draws surfaces is hereinafter referred to as a drawing unit. The drawing unit may be individually allocated with a physical surface.

However, when combining surfaces drawn on different physical surfaces, there is a possibility of mis-synchronization of the displayed contents. For example, it is assumed that in a user interface in which a frame image and a menu image are displayed, the surfaces of the frame image and the menu image are drawn by different drawing units. In this case, even if the frame image is moved horizontally, for example, the menu image may be displayed without changing its position or may move later than the frame image.

This is because the drawing unit that draws the surface of the frame image notifies that the surface of the frame image is to be moved and the drawing unit that draws the surface of the menu image draws a new surface according to the notification, but each surface is drawn separately, even if the drawing of the surface of the frame image is completed and the display of the frame image is updated, if the drawing of the surface of the menu image is not completed, the display of the menu image will not be updated and the original menu image may be displayed as it is.

According to one aspect of the present disclosure, a vehicular device capable of providing multiple contents with one user interface, includes a synchronization unit configured to synchronize surfaces drawn on different physical surfaces and a physical surface that is one of the physical surfaces and is allocated to the synchronization unit. The synchronization unit loads in the surface drawn on a different physical surface that is different from the physical surface allocated to the synchronization unit, and synchronizes the surface drawn by the synchronization unit and the surface drawn on the different physical surface by processing the surface that is loaded in as the surface drawn by the synchronization unit. Accordingly, the surfaces drawn on the different physical surfaces can be synchronized.

Hereinafter, multiple exemplary embodiments will be described with reference to the drawings. Further, the configurations that are substantially common in each embodiment will be described with the same reference numerals.

First Embodiment

A first embodiment will be described below. As shown in FIG. 1, a vehicular device 1 forms a cockpit system 5 with three displays, for example, a meter display 2, a center display 3, and a head-up display 4.

The meter display 2 includes, for example, a liquid crystal display or an organic EL display, and is assumed to be installed on a portion of a dashboard near a front of a driver. The center display 3 is, for example, a liquid crystal display or an organic EL display, and is assumed to be provided in the vicinity of a center console.

The head-up display 4 is, for example, a liquid crystal display, an organic EL display, or a projector that projects an image onto a front window, and is assumed to be provided in the vicinity of the front of the driver on the dashboard. However, the number, the arrangement, or the configuration of the display devices is merely an example, and the present disclosure is not limited these examples.

Although FIG. 1 shows an example of the vehicular device 1 being connected to multiple displays, as described below, the vehicular device 1 of the present embodiment is intended to synchronize surfaces in one user interface. Therefore, there need only be one or more displays connected to the vehicular device 1.

The vehicular device 1 is communicatively connected to several electronic control units 6 (hereinafter referred to as ECUs 6) that are installed in a vehicle. Although the vehicular device 1 can be considered as one of the ECUs 6, for ease of understanding, the vehicular device 1 and the ECUs 6 are separated in the present disclosure.

Figure 2:
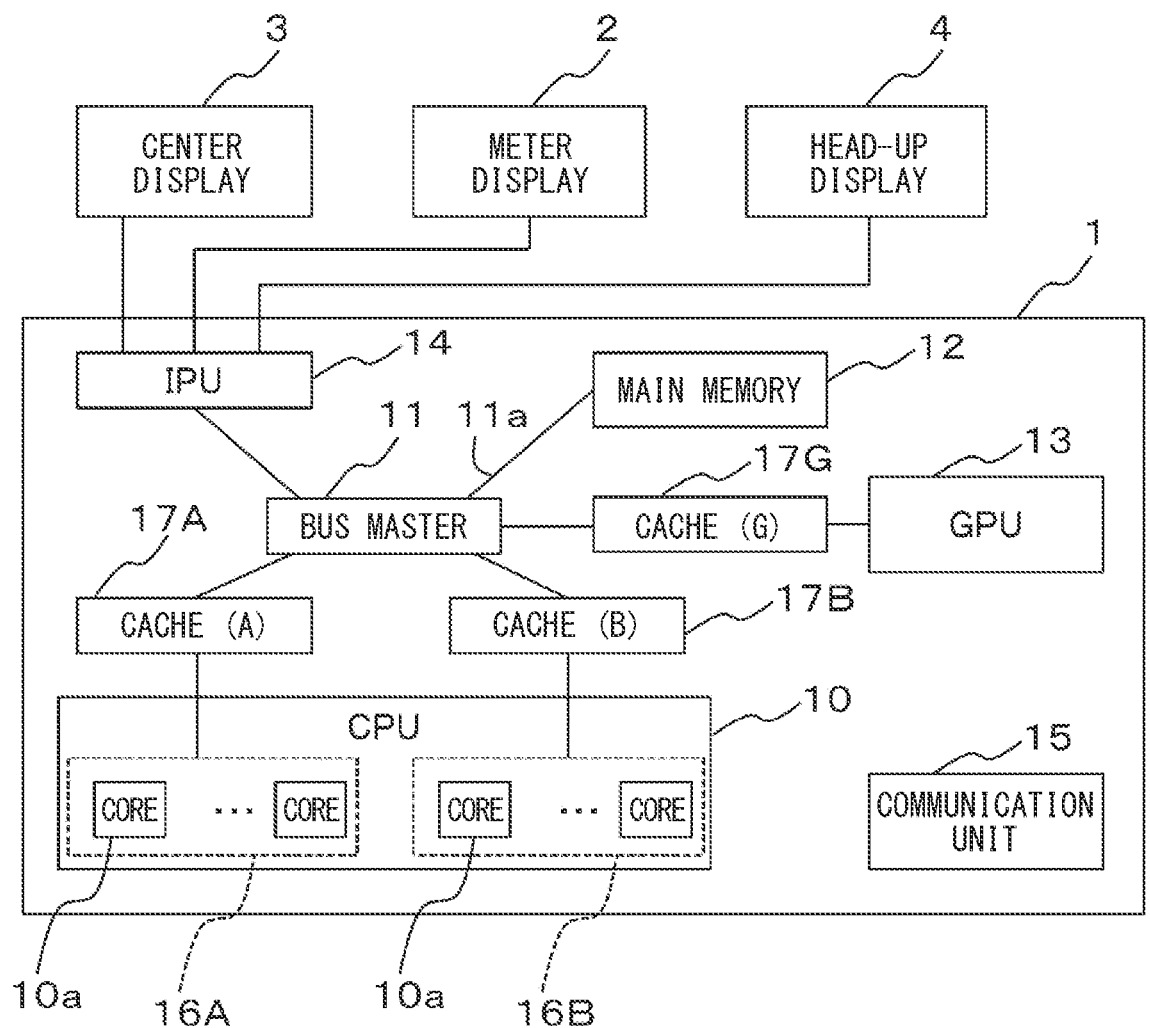
FIG. 2 is a diagram showing an example of an electrical configuration of a vehicular device.

As shown in FIG. 2, the vehicular device 1 includes a CPU 10, a bus master 11, a main memory 12, a graphics processing unit 13 (hereinafter referred to as GPU 13), an image processing unit 14 (hereinafter referred to as IPU 14), a communication unit 15, and the like.

The GPU 13 is a functional unit that actually draws a surface instructed by an application program, as described below. Note that the surface is, in brief, an image data that is a source of a content image displayed at a certain moment. The IPU 14 is a functional unit that outputs the drawn surface as a video signal to each display.

The CPU 10 includes multiple, for example, eight cores 10a. These eight cores 10a are grouped into four cores each, and are allocated to two CPU modules 16A and 16B. In other words, multiple CPU modules 16 that are capable of operating functionally independently are provided in the vehicular device 1.

The CPU module 16A is allocated to an application group 22A that relatively requires real-time property, and the CPU module 16B is allocated to an application group 22B that does not relatively require real-time property. Hereafter, when giving explanations common to CPU modules 16, they are referred to simply as the CPU modules 16 without adding A or B.

Each of the CPU modules 16 and the GPU 13 has a dedicated cache memory 17. Hereinafter, the cash memory provided for the CPU module 16A is referred to as a cache 17A for convenience, the cache memory provided for the CPU module 16B is referred to as a cache 17B for convenience, and the cache memory provided for the GPU 13 is referred to as a cache 17G for convenience. Each of the cache memories 17 is connected to the main memory 12 and the IPU 14 via a bus 11a and the bus master 11, and is configured to be able to transmit and receive data mutually.

The communication unit 15 performs communication with other ECUs 6. The communication unit 15 includes, for example, a controller area network interface. Depending on the type of the ECUs 6, a wireless communication method such as Wi-Fi, or a wired communication method such as USB may be employed.

Figure 3:
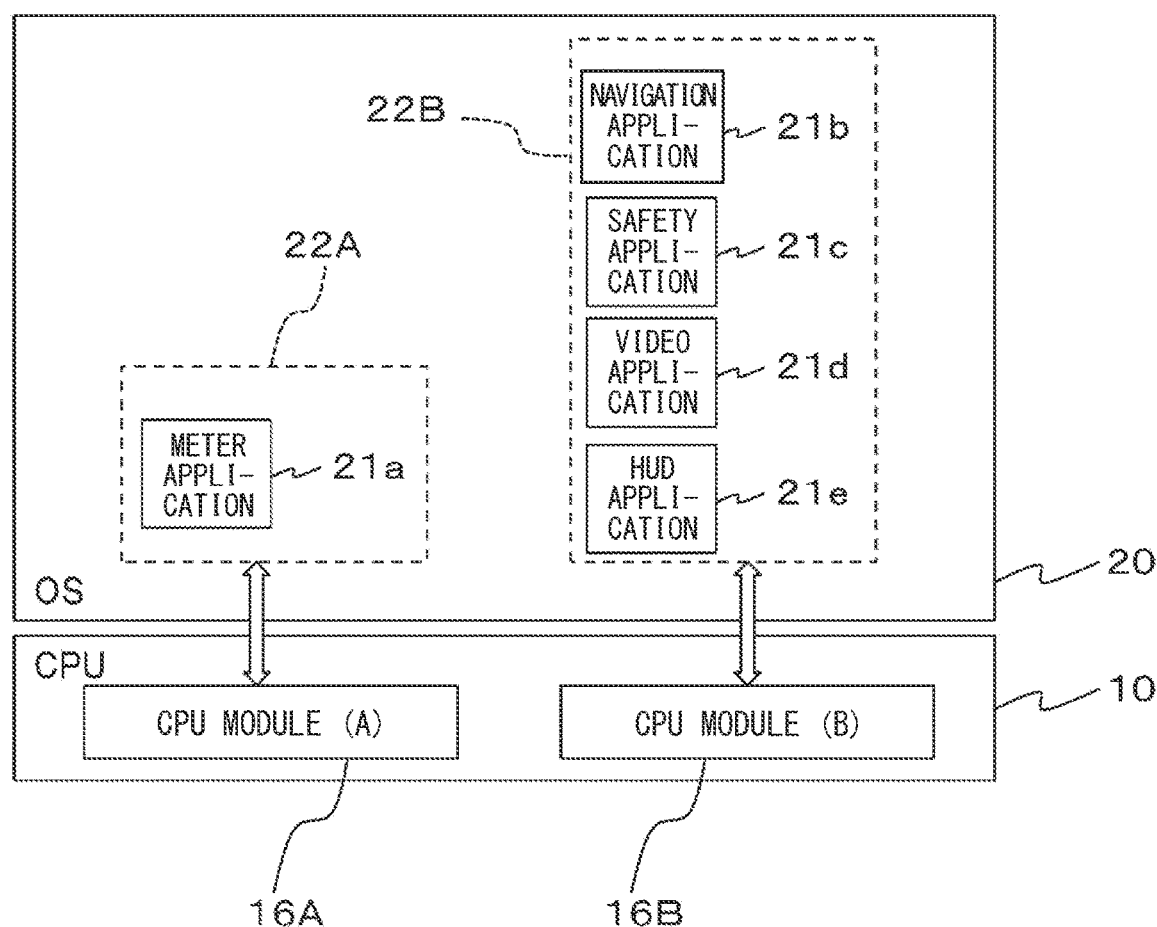
FIG. 3 is a diagram showing an example of a software configuration of the vehicular device.

As shown in FIG. 3, in the vehicular device 1, an operating system 20 (hereinafter referred to as "OS 20") is executed on the CPU 10, and multiple application programs 21 (hereinafter referred to as "applications 21") are executed on the OS 20. The applications 21 executed on the OS 20 include a meter application 21a, a navigation application 21b, a safety application 21c, a video application 21d, and a HUD application 21e. HUD is an abbreviation for head up display. Each application 21 is an example, and the applications 21 executed on the OS 20 are not limited to these examples.

The meter application 21a informs the user of a speed of the vehicle, a rotation number, or warnings, for example, and also draws surfaces that are mainly displayed on the meter display 2. For example, the meter application 21a draws a surface for displaying contents such as a speedometer M1, a tachometer M2 or a warning light M3, as shown in a user interface 23 shown in FIG. 4A as a normal display mode.

However, the surfaces drawn by the meter application 21a can also be displayed on the center display 3 or the head-up display 4. The surface drawn by the meter application 21a is relatively required to have the real-time property as compared with the surface drawn by the other exemplified applications 21. Although the meter application 21a instructs the GPU 13 to draw the surface in practice, here, it is expressed that the meter application 21 is to draw the surface for the sake of simplicity. Here, a similar explanation can be applied to the other applications 21.

The navigation application 21b implements a navigation function and draws surfaces mainly displayed on the center display 3. For example, as shown in FIG. 5, the navigation application 21b draws a surface for displaying a content such as a navigation screen M4 including a map, a current position of the vehicle, and the like. However, the surfaces drawn by the navigation application 21b can be displayed on the meter display 2 as a navigation display mode shown in FIG. 4B, for example, and can also be displayed on the head-up display 4.

The safety application 21c implements various functions of displaying a menu and driving support, and draws surfaces mainly displayed on the center display 3. For example, as shown in FIG. 5, the safety application 21c draws a surface for displaying a content such as multiple icons M5 for selecting a target function or a content. However, the surfaces drawn by the safety application 21c can be displayed on the meter display 2 as a menu display mode shown in FIG. 4C, for example, and can also be displayed on the head-up display 4.

Figure 6:
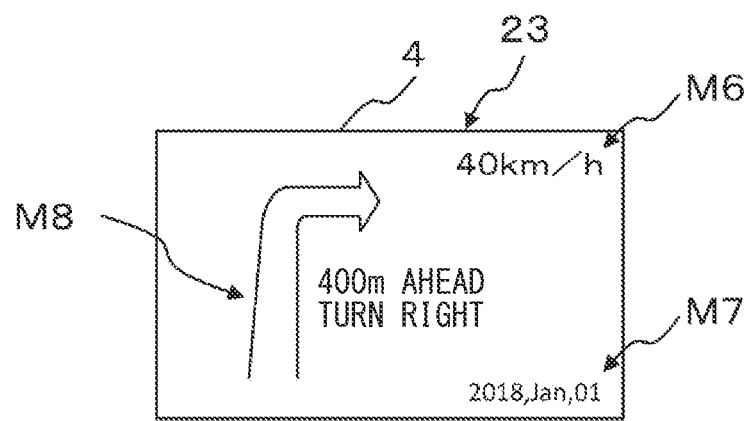
FIG. 6 is a diagram showing an example of a display mode of a head-up display.

The HUD application 21e notifies the user of, for example, a speed, a future course, and the like, and draws surfaces mainly displayed on the head-up display 4. For example, as shown in FIG. 6, the HUD application 21e draws a surface for displaying current speed information M6, time information M7, or course information M8 indicating a distance to a corner, a turning direction, and the like.

However, the surfaces drawn by the HUD application 21e can also be displayed on the meter display 2 or the center display 3.

As shown in FIG. 7A to FIG. 7E, a physical surface 30 for drawing the surface is individually allocated to each of the applications 21. That is, each of the applications 21 functions as a drawing unit that draws a surface, which is a content holding unit, on the physical surface 30 allocated to each of the applications 21. Although details will be described later, each of the applications 21 corresponds to a synchronization unit that loads in a surface, which is a content holding unit, into the physical surface 30 allocated to each of the applications 21 and that synchronizes the surface.

The physical surfaces 30 are secured in a size such that necessary surfaces can be drawn, that is, provided on the cache memory 17 or the main memory 12. A size of the physical surface 30 does not need to be equal to the number of pixels of the display device. This is because a necessary surface is selected from the surfaces drawn on the physical surface 30 and displayed on the display device.

In the present embodiment, a physical surface 30A is allocated to the meter application 21a, a physical surface 30B is allocated to the navigation application 21b, a physical surface 30C is allocated to the safety application 21c, a physical surface 30D is allocated to the video application 21d, and a physical surface 30E is allocated to the HUD application 21e. Then, one or more surfaces are drawn on each of the physical surfaces 30 by each of the applications 21.

For example, surfaces SA1 to SA3 are drawn on the physical surface 30A by the meter application 21a. Similarly, a surface SB1 is drawn on the physical surface 30B by the navigation application 21b. Surfaces SC1 and SC2 are drawn on the physical surface 30C by the safety application 21c. In FIG. 7C, for simplification of description, multiple surfaces drawn by the safety application 21c are collectively referred to as the surface SC1. A surface SD1 is drawn on the physical surface 30D by the video application 21. Surfaces SE1 to SE3 are drawn on the physical surface 30E by the HUD application 21e. The above surfaces are examples.

At least one of the contents displayed on the display devices is subjected to an animation operation. Here, the animation operation is a display mode in which a position and a size of an image indicating the content gradually change, the image rotates, the user interface 23 moves as a whole along with a swipe operation, the image gradually fades in or fades out, the color of the image changes, and the like.

Figure 4A:
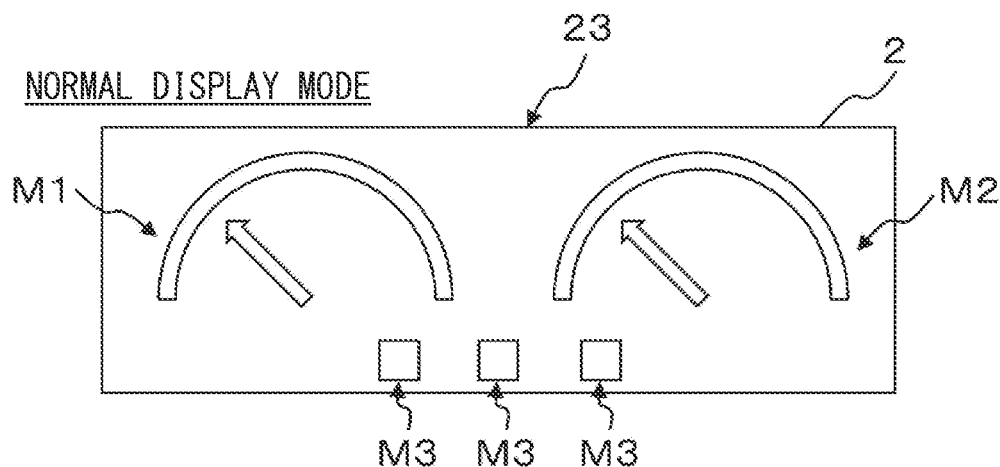
FIG. 4A is a diagram showing an example of a normal display mode of a meter display.
Figure 4B:
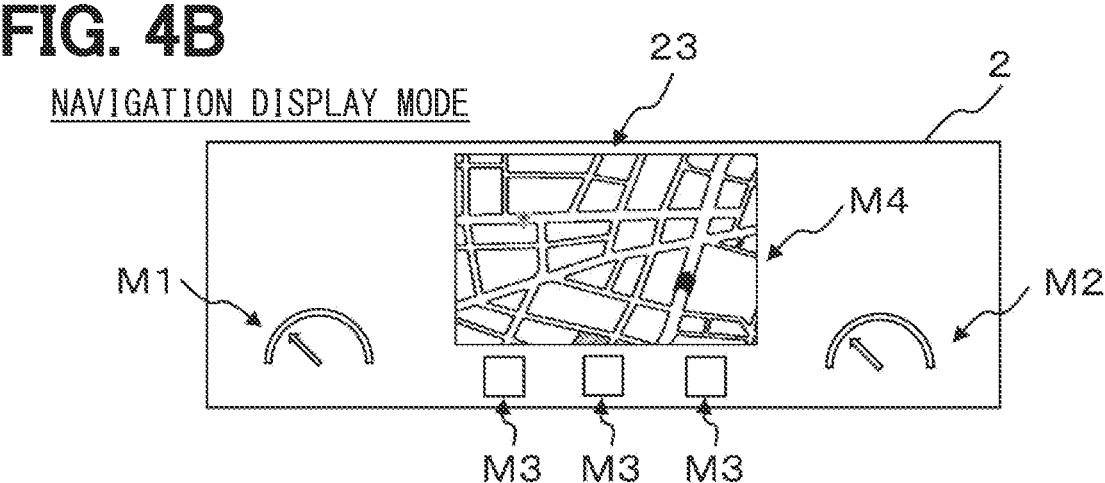
FIG. 4B is a diagram showing an example of a navigation display mode of the meter display.
Figure 4C:
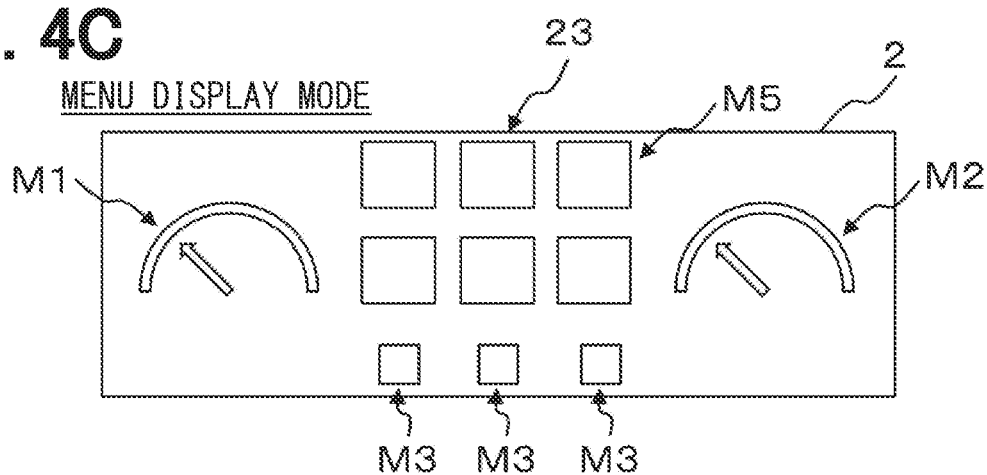
FIG. 4C is a diagram showing an example of a menu display mode of the meter display.
Figure 5:
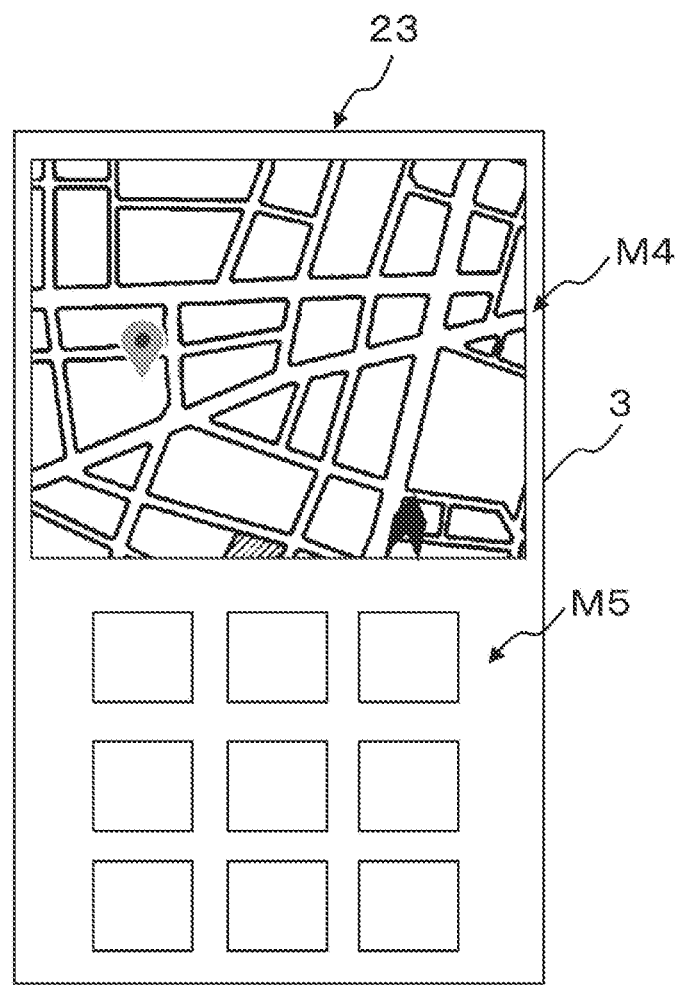
FIG. 5 is a diagram showing an example of a display mode of a center display.

For example, as shown in FIG. 4A to FIG. 4C, the speedometer M1, the tachometer M2, a map, a menu, or the like are a content whose size and position change depending on a display mode or the display device at a display destination. However, the animation operation is not limited thereto, and any animation operation in which the display mode changes continuously or intermittently from a certain time point is included.

Next, the effects of the configuration described above will be explained.

As described above, the physical surfaces 30 are individually allocated to the applications 21, and the applications 21 individually draw a surface on the physical surfaces 30. At this time, if display is executed by a method in the related arts in which the IPU 14 combines the surfaces drawn on the physical surfaces 30, a synchronization deviation of the displayed content may occur.

This is because a timing at which the drawing of the surface is completed may be different for each of the applications 21. Here, by using a method as a comparative example shown in FIG. 8A and FIG. 8B, in the navigation display mode of a screen transition, it is assumed that the animation operation of displaying, in an enlarged manner, the speedometer M1 and the tachometer M2 is performed. In FIG. 8B, the reference numerals of the contents are omitted.

Figure 8A:
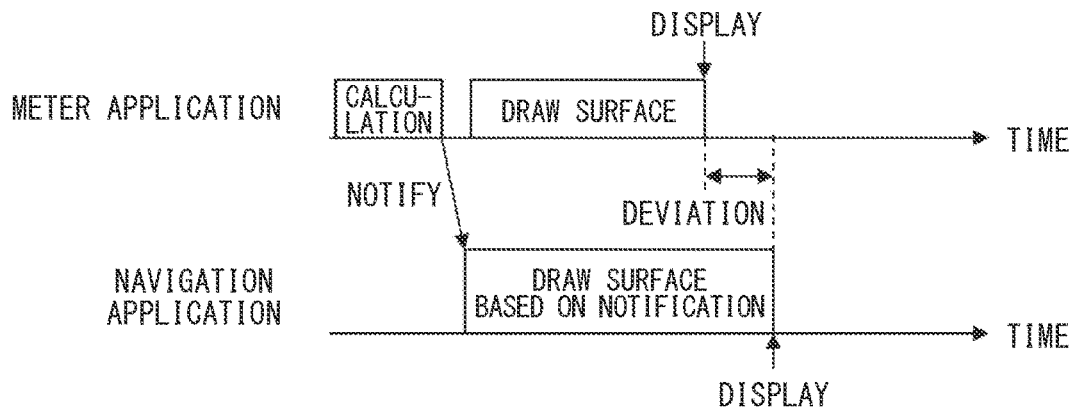
FIG. 8A is a diagram showing an example of a sequence of a display mode by a method as a comparative example.
Figure 8B:
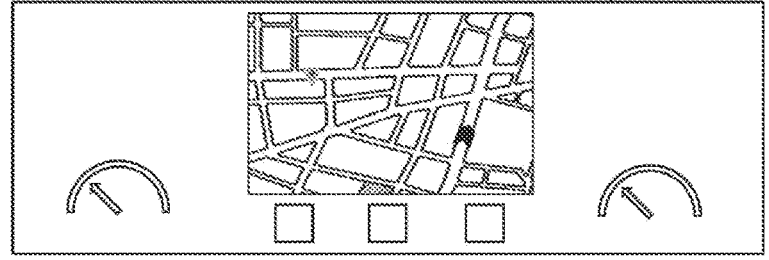
FIG. 8B is a diagram showing an example of a screen transition of the display mode by the method as the comparative example.
Figure 8B:
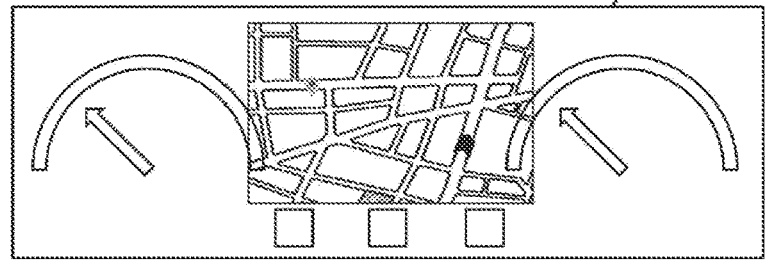
Figure 8B:
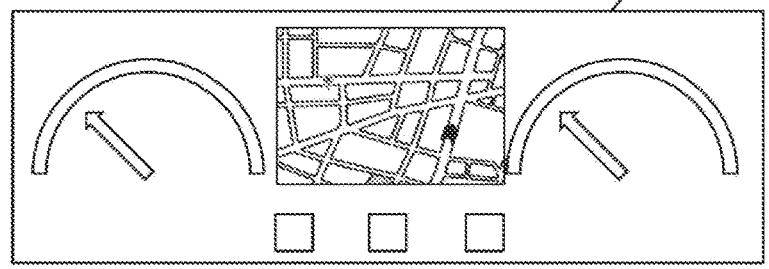

In this case, since it is necessary to relatively reduce in size of the map, in the comparative example shown in FIG. 8A and FIG. 8B, as shown in the sequence, the meter application 21a first calculates the size and the position of the surface to be updated, notifies the navigation application 21b of a calculation result, and draws the surface in accordance with the size and the position after the update. On the other hand, when the navigation application 21b receives a notification from the meter application 21a, the navigation application 21b specifies the size and the position of the surface after the update based on the notification, and draws the new surface, that is, executes the update such that the new surface has the specified size and the specified position.

At this time, if the drawing of the surface has been completed first by the meter application 21a, the IPU 14 combines and displays the surface at that time point. However, since the drawing of the surface is not completed by the navigation application 21b, an original surface is displayed as it is. As a result, as a synchronization deviation state shown in FIG. 8B, the speedometer M1 and the tachometer M2 may overlap the navigation screen M4.

After that, when the drawing of the surface in the navigation application 21b is completed, each surface is displayed in an intended state as a synchronous state shown in FIG. 8C. The synchronization deviation shown in FIG. 8A and FIG. 8B is an example, and for example, when a menu is displayed in a frame, a synchronization deviation in which the menu does not move even when the frame is moved may occur.

As described above, when the method in the related arts is used, surfaces drawn on different physical surfaces 30 cannot be synchronized, and for example, a display deviation occurs. Since the synchronization at the time of displaying on the display device is deviated, the user may visually recognize the synchronization deviation and may have a feeling of fault.

Therefore, in the vehicular device 1, the surfaces drawn on the different physical surfaces 30 are synchronized in the following manner. Although the following processing can be executed by any application 21, here, a case in which the surface of the speedometer M1 or the like drawn by the meter application 21a and the surface of the navigation screen M4 drawn by the navigation application 21b are synchronized will be described as an example in comparison with the example in FIG. 8A and FIG. 8B described above. In this example, the meter application 21a corresponds to a first application program, the navigation application 21b corresponds to a second application program, the physical surface 30A allocated to the meter application 21a corresponds to a first physical surface, the physical surface 30B allocated to the navigation application 21b corresponds to a second physical surface.

Figure 7A:
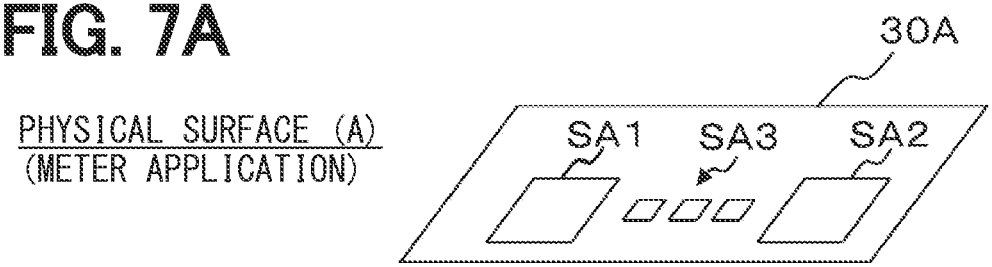
FIG. 7A is a diagram showing an example of a physical surface allocated to a meter application.
Figure 7B:
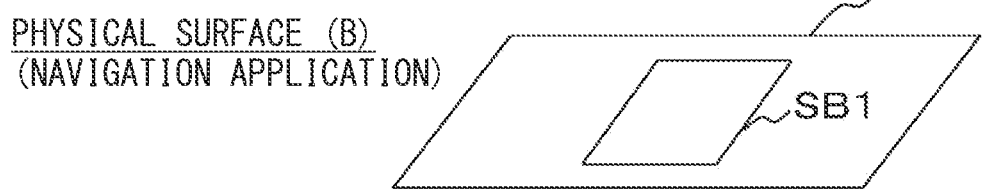
FIG. 7B is a diagram showing an example of a physical surface allocated to a navigation application.
Figure 7C:
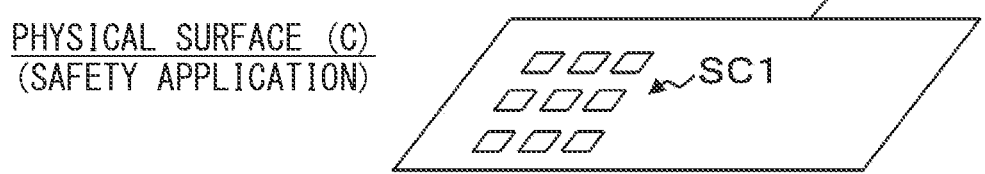
FIG. 7C is a diagram showing an example of a physical surface allocated to a safety application.
Figure 7D:
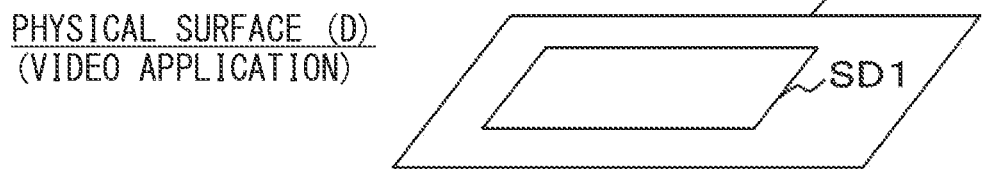
FIG. 7D is a diagram showing an example of a physical surface allocated to a video application.
Figure 7E:
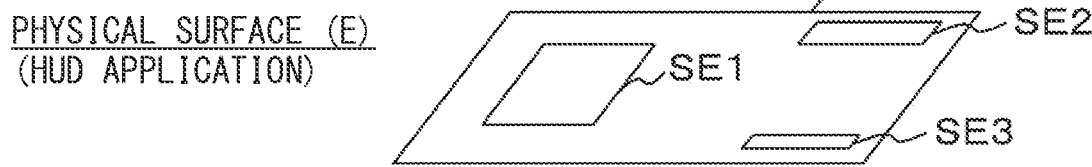
FIG. 7E is a diagram showing an example of a physical surface allocated to HUD application.
Figure 9:
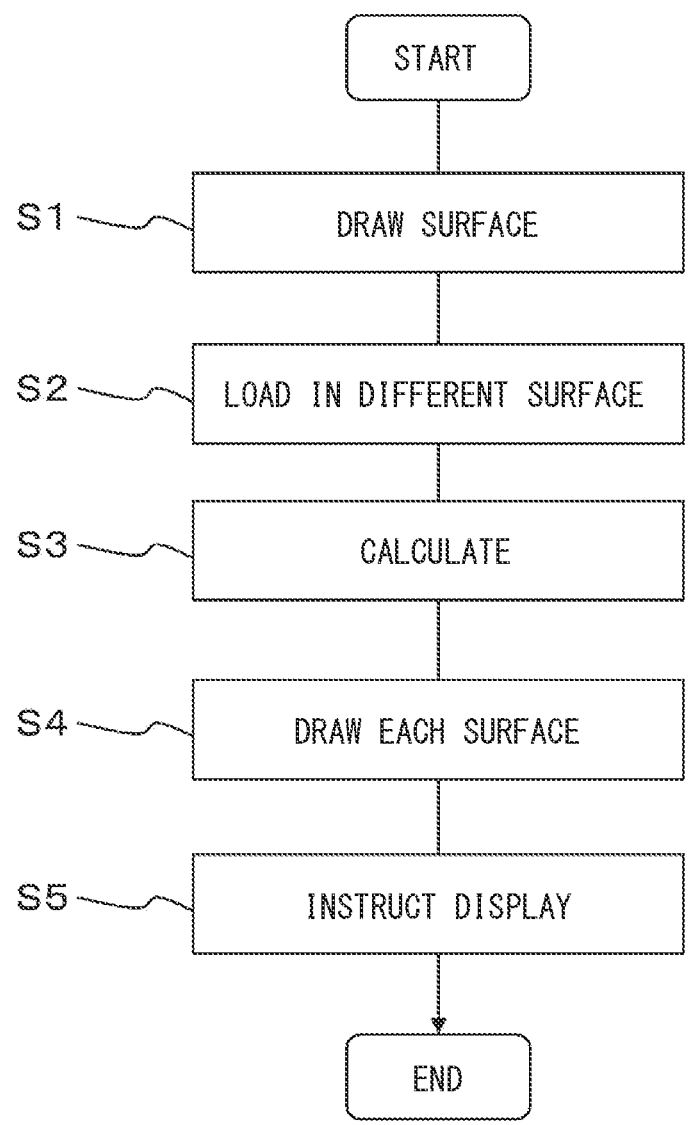
FIG. 9 is diagram showing a flow of a synchronization process.

The meter application 21a executes the synchronization processing shown in FIG. 9, and draws the surfaces SA1 to SA3 on the physical surface 30A allocated to the meter application 21a in S1 as shown in FIG. 7A. For example, the meter application 21a draws the surface SA1 for displaying the speedometer M1, the surface SA2 for displaying the tachometer M2, and the surface SA3 for displaying the warning light M3.

Figure 10:
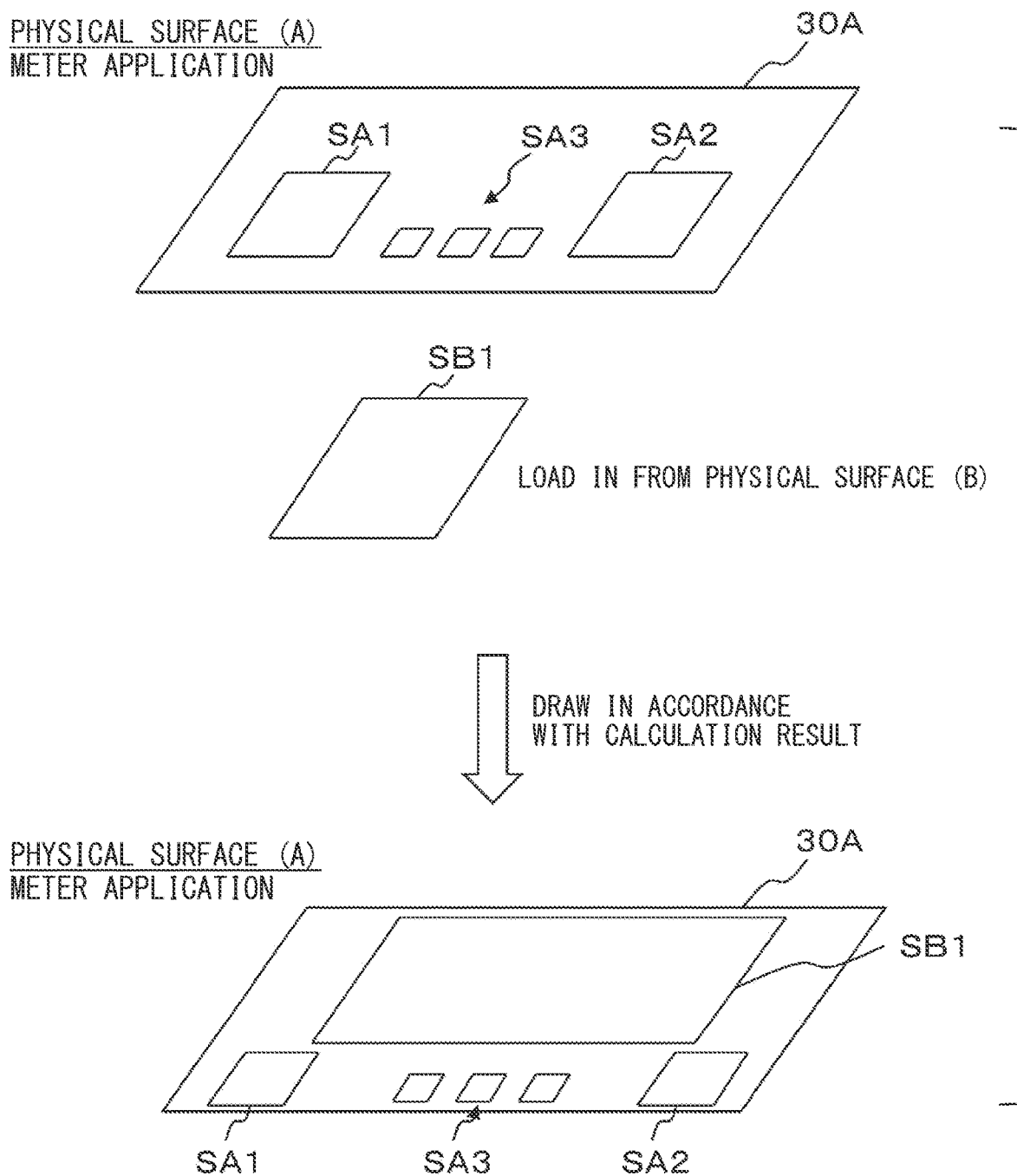
FIG. 10 is a diagram showing an example of a mode of loading in a surface.

Then, in S2 in the synchronization processing, the meter application 21a loads in the surface drawn on the different physical surface 30. In this case, as shown in FIG. 10, the meter application 21a loads in the surface SB1 drawn on the different physical surface 30B by the navigation application 21b into the physical surface 30A on which the surfaces SA1 to SA3 are drawn. At a time point of loading in, the surface SB1 has a size and a shape when drawn by the navigation application 21b.

Subsequently, in S3 in the synchronization processing, the meter application 21a calculates a position, a size, a deformation amount, or the like of the surfaces including the surfaces SA1 to SA3 drawn by the meter application 21a and the surface SB1 that is loaded in. That is, the meter application 21a treats the surface SB1 that is loaded in as a texture, and calculates the position, the size, or the deformation amount of the texture, thereby processing the surface SB1 as a surface drawn by the meter application 21a in a pseudo manner.

When the calculation is completed, the meter application 21a draws each surface on the physical surface 30A of the meter application 21a according to a calculation result in S4 in the synchronization processing. Accordingly, as shown in FIG. 10, the surfaces SA1 to SA3 drawn by the meter application 21a and the surface SB1 drawn by the navigation application 21b are drawn on the physical surface 30A in accordance with the calculated size and position. That is, each surface is redrawn or rearranged according to the calculation result.

At this time, the surface SB1 drawn on the different physical surface 30B is separated from the physical surface 30B at a time point when the surface SB1 is loaded in into the physical surface 30A. Therefore, regardless of a drawing operation of the navigation application 21b, the surface SB1 can be displayed on the meter application 21a with an appropriate size, position, or deformation amount.

Therefore, in S5 in the synchronization processing, the meter application 21a can display each surface in an appropriate state by instructing display of each surface for which redrawing or rearrangement has been completed. This means that, when an animation operation is executed, the navigation screen M4 is reduced in size as the speedometer M1 and the tachometer M2 are enlarged, and a display can be seamlessly changed without overlapping the speedometer M1, the tachometer M2, and the navigation screen M4.

Figure 11A:
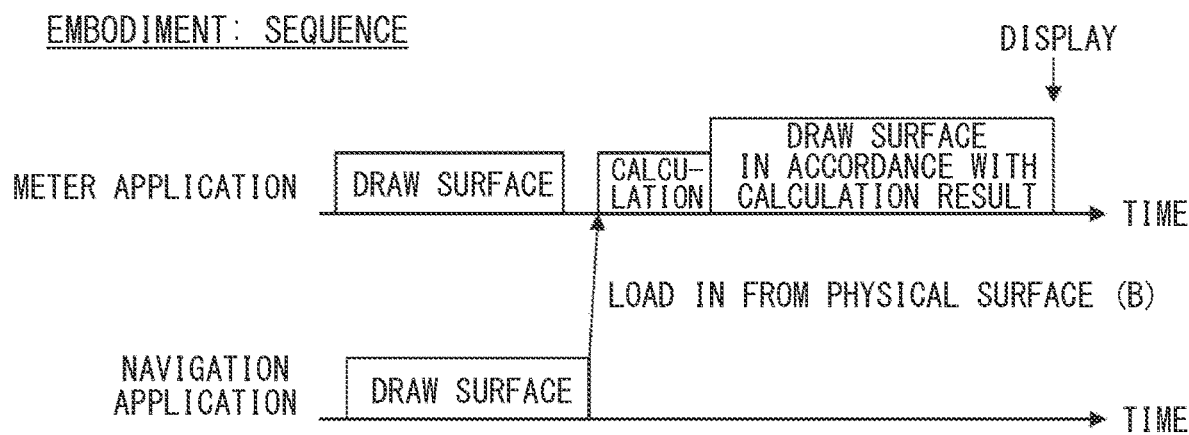
FIG. 11A is a diagram showing an example of a sequence of the display mode of the vehicular device.
Figure 11B:
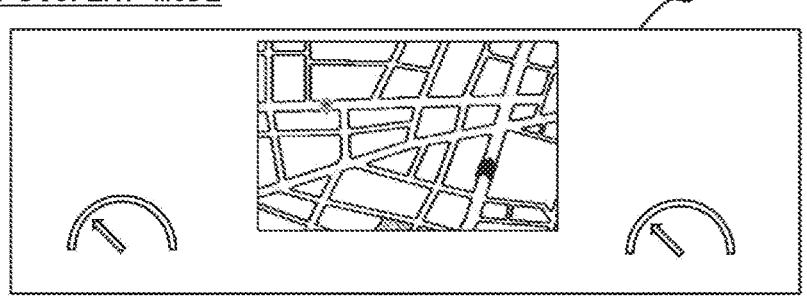
FIG. 11B is a diagram showing an example of a screen transition of the display mode of the vehicular device.
Figure 11B:
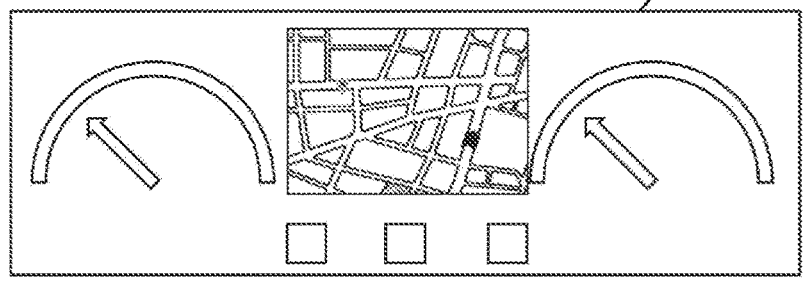

More specifically, in the vehicular device 1, as a sequence according to the embodiment shown in FIG. 11A and FIG. 11B, each application 21 draws a surface. Then, the application 21 requiring the surface drawn on the different physical surface 30, here, the meter application 21a loads in the surface drawn by the navigation application 21b into the physical surface 30 of the meter application 21a, calculates the position, size, and the like of the surface that is loaded in, and redraws the surface.

Accordingly, for example, when the meter application 21a executes an animation operation in which the speedometer M1 or the tachometer M2 is displayed in an enlarged manner, the meter application 21a can control the size, the position, and the like of the surface drawn on the different physical surface 30 so as to correspond to the animation operation. Accordingly, as shown in the embodiment: screen transition, the speedometer M1 and the tachometer M2 are prevented from overlapping the navigation screen M4. That is, it is possible to synchronize the surfaces drawn on the different physical surfaces 30. In FIG. 11B, the reference numerals of the contents are omitted.

According to the embodiment described above, the following effects can be achieved. The vehicular device 1 can provide multiple contents by one user interface 23, and includes a synchronization unit that synchronizes the surfaces which are content holding units. Then, the synchronization unit loads in a surface drawn on the different physical surface 30 different from the physical surface 30 allocated to the synchronization unit and treats the surface that is loaded in as the surface drawn by the synchronization unit, thereby synchronizing the surface drawn by the synchronization unit with the surface drawn on the different physical surface 30.

Accordingly, even if the surface is drawn on the different physical surface 30, when the surface is displayed on the user interface 23, the synchronization unit can control the timing at which the display is updated. That is, it is possible to share the surface drawn on the different physical surface 30. Accordingly, the surfaces drawn on the different physical surfaces 30 can be synchronized. More specifically, the surface drawn by the synchronization unit and the surface drawn on the different physical surface 30 can be synchronized, and a state in which the user can visually recognize a fault, which is the display deviation or the like, can be avoided.

The control method of the vehicular device 1 includes, when multiple contents are provided by one user interface 23, drawing the surface, which is the content holding unit, on the physical surface 30 allocated to a synchronization unit, loading in a surface drawn on the different physical surface 30 different from the physical surface 30 allocated to the synchronization unit, and synchronizing the surface drawn by the synchronization unit with the surface drawn on the different physical surface 30 by processing the surface that is loaded in as the surface drawn by the synchronization unit.

According to such a control method of the vehicular device 1 as well, the surfaces drawn on different physical surfaces 30 can be synchronized with each other, and the surface drawn by the synchronization unit and the surface drawn on the different physical surface 30 can be synchronized with each other.

In the vehicular device 1, at least one of the contents is subjected to the animation operation. In a case in which the animation operation is executed on the content, if the original surfaces are not synchronized with each other, the display of the content may be deviated, overlapped, or the like, which may cause a fault that the user can visually recognize. Therefore, by synchronizing the original surfaces, even when the position and the size of the content are changed, the above-described fault can be prevented from occurring.

In the vehicular device 1, multiple applications 21 are executed, and the synchronization unit is implemented as the application 21, and synchronizes a surface drawn by the synchronization unit with a surface drawn on the different physical surface 30 by the different application 21. Accordingly, it is possible to prevent each of the applications 21 from being applied with an excessive load.

Therefore, as in the meter application 21a according to the embodiment, the application 21 that draws a surface relatively requiring the real-time property as compared with the surface drawn on the different physical surface 30 can synchronize the surface relatively requiring the real-time property with the surface drawn on the different physical surface 30 without delaying the display of the speedometer M1, the tachometer M2, or the warning light M3 that is required.

The vehicular device 1 includes multiple CPU modules 16, and the synchronization unit synchronizes a surface drawn by the synchronization unit with a surface drawn on the different physical surface 30 provided for a different CPU module 16. In this case, since the physical surface 30 is managed for each CPU module 16, the physical surface 30A on which the meter application 21a draws the surface and the physical surface 30B on which the navigation application 21b draws the surface are shared across the CPU modules 16. With such a configuration, by employing the above-described control method, the surfaces drawn on the different physical surfaces 30 can be synchronized.

Second Embodiment

Next, a second embodiment will be described. In the second embodiment, a configuration example of a vehicular device 1 different from that according to the first embodiment will be described. In order to simplify the description, the vehicular device 1, an OS 20, or an application 21 will be described with common reference numerals. A method of a synchronization control and the like are common to those according to the first embodiment.

<First Configuration Example>

Figure 12:
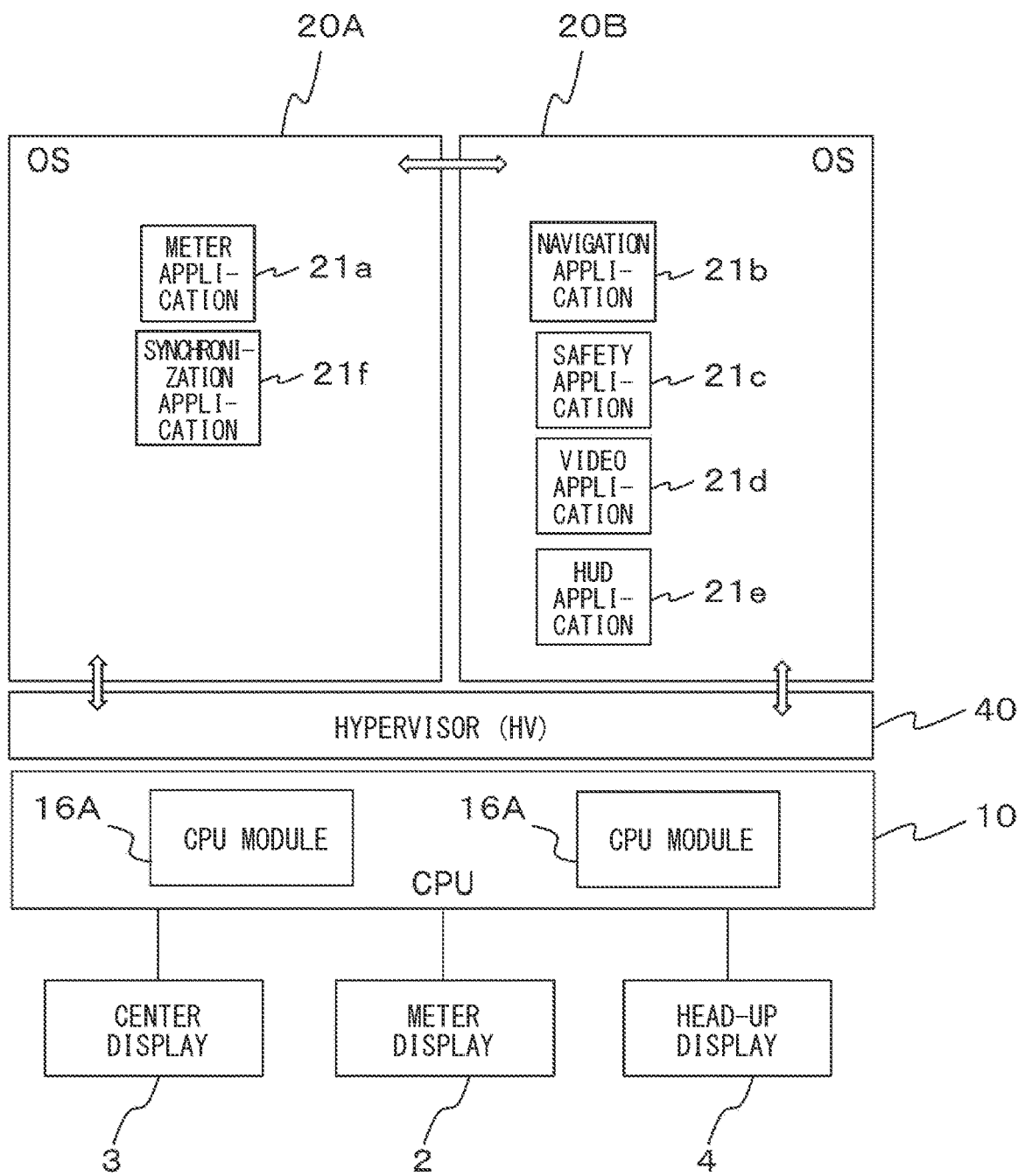
FIG. 12 is a diagram showing a configuration example of a vehicular device according to a second embodiment.

In a first configuration example, as shown in FIG. 12, in the vehicular device 1, a hypervisor 40 is executed on the CPU 10, and multiple, for example, two OSs 20A and 20B are executed on the hypervisor 40. At this time, an OS 20A is allocated to the CPU module 16A, and an OS 20B is allocated to a CPU module 16B. In the present embodiment, it is assumed that the OS 20A is in charge of processing having a relatively high real-time property, and the OS 20B is in charge of processing having a relatively low real-time property.

Therefore, in the OS 20A, for example, a meter application 21a that requires the real-time property is executed, and in the OS 20B, a navigation application 21b, a safety application 21c, an HUD application 21e, a video application 21, and the like that do not require the real-time property as much as the OS 20A are executed. The type of the OS 20 and the arrangement of the applications 21 are merely examples, and the present disclosure is not limited these examples.

In this case, since a physical surface 30 is managed for each OS 20, a physical surface 30A on which the meter application 21a draws a surface and a physical surface 30B on which the navigation application 21b draws a surface are across CPU modules 16 and the OS 20. In other words, a synchronization unit needs to share the surfaces across the CPU modules 16 and the OS 20. Even in such a case, by adopting the control method described in the first embodiment, the surfaces drawn on the different physical surfaces 30, here, the physical surfaces 30 of the different OSs 20 of the different CPU modules 16 can be shared and synchronized.

Although in the first embodiment, the configuration in which each surface is used as the synchronization unit by the application 21 that draws the surface by the synchronization unit, that is, the application 21 has been exemplified, a configuration can be adopted in which a synchronization application 21f dedicated to synchronization is implemented and the drawing of the surface and the sharing of the surface are separately processed. In other words, the synchronization unit that draws the surface, which is a content holding unit, on the physical surface 30 allocated to the synchronization unit, and a synchronization application 21f serving as a synchronization unit that loads in, into the physical surface 30 allocated to the application 21f, a surface drawn on a different physical surface 30 and calculates a position, a size, or a deformation amount of the surface that is loaded in can be provided. Even with such a configuration, the surfaces drawn on the different physical surfaces 30 can be synchronized by loading in by the synchronization unit the surfaces drawn by the synchronization unit. The synchronization application 21f can be applied to all of the display devices, and can be individually provided in each of the display devices.

The hypervisor 40 may be configured to be executed as a function of the OS 20A. That is, the OS 20A can be executed on the CPU 10, the hypervisor 40 can be operated as a function of the OS 20, and the OS 20B can be executed on the hypervisor 40.

<Second Configuration Example>

Figure 13:
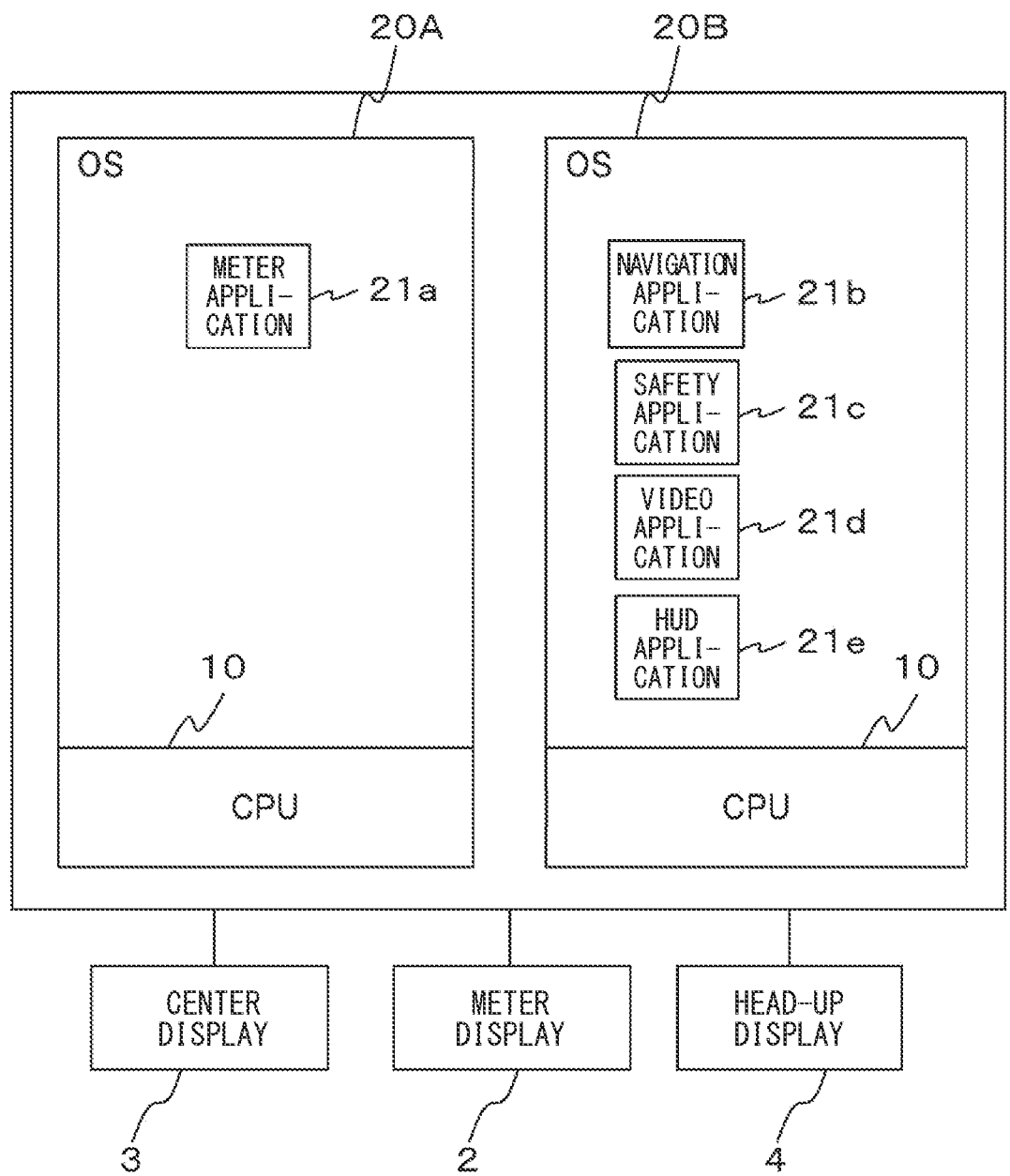
FIG. 13 is a diagram showing another configuration example of a vehicular device.

In a second configuration example, as shown in FIG. 13, the vehicular device 1 includes multiple CPUs 10, and each of the OS 20A and the OS 20B is executed on a respective one of the CPUs 10. In this case, since the physical surface 30 is managed for each CPU 10, the physical surface 30A on which the meter application 21a draws the surface and the physical surface 30B on which the navigation application 21b draws the surface are across the CPU 10.

In other words, the synchronization unit needs to share the surface across the CPU 10. Even in such a case, by adopting the control method described in the first embodiment, the surfaces drawn on the different physical surfaces 30, here, the physical surfaces 30 on different CPU module 16 sides can be shared and synchronized.

Third Embodiment

Next, a third embodiment will be described. In the third embodiment, an example in which surfaces are synchronized between a vehicular device 1 and an ECU 6 will be described. In order to simplify the description, the vehicular device 1, an OS 20, or an application 21 will be described with common reference numerals. The configuration of the vehicular device 1 is similar to the configuration of the vehicular device 1 according to the first embodiment or the second embodiment, and a synchronization control method similar to the synchronization control method according to the first embodiment can be adopted.

Figure 14:
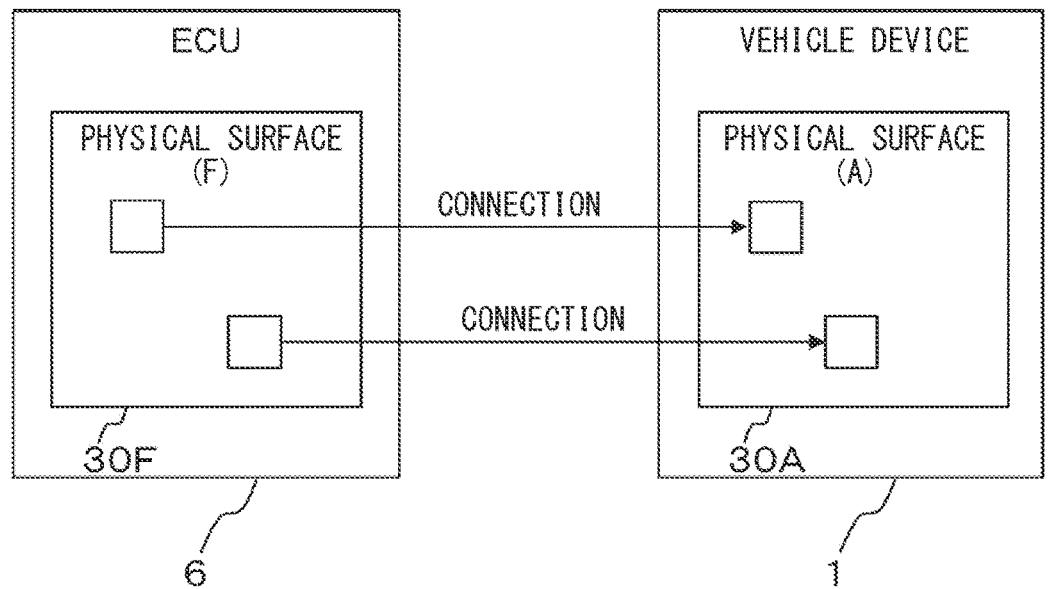
FIG. 14 is a first diagram showing an example of how to load in surfaces in a third embodiment.

In the third embodiment, as shown in FIG. 14, the vehicular device 1 is communicably connected to another ECU 6, and synchronizes, using a control method similar to the control method according to the first embodiment, a surface drawn on a physical surface 30 by the synchronization unit of the vehicular device 1 and the surface drawn on a different physical surface 30 of the ECU 6.

Specifically, in the case of the meter application 21a, for example, the vehicular device 1 loads in the surface drawn on the physical surface 30F into the physical surface 30A of the vehicular device 1, calculates a position, a size, or a deformation amount, draws each surface based on a calculation result, and then displays the surface, thereby synchronizing the surface drawn on the physical surface 30A by the vehicular device 1 with the surface drawn on the different physical surface 30F.

At this time, the vehicular device 1 can individually attach a connection to load in the surface drawn on the physical surface 30F of the ECU 6. Accordingly, the necessary surfaces can be individually loaded in, and the surfaces drawn on the different physical surfaces 30 can be synchronized.

Figure 15:
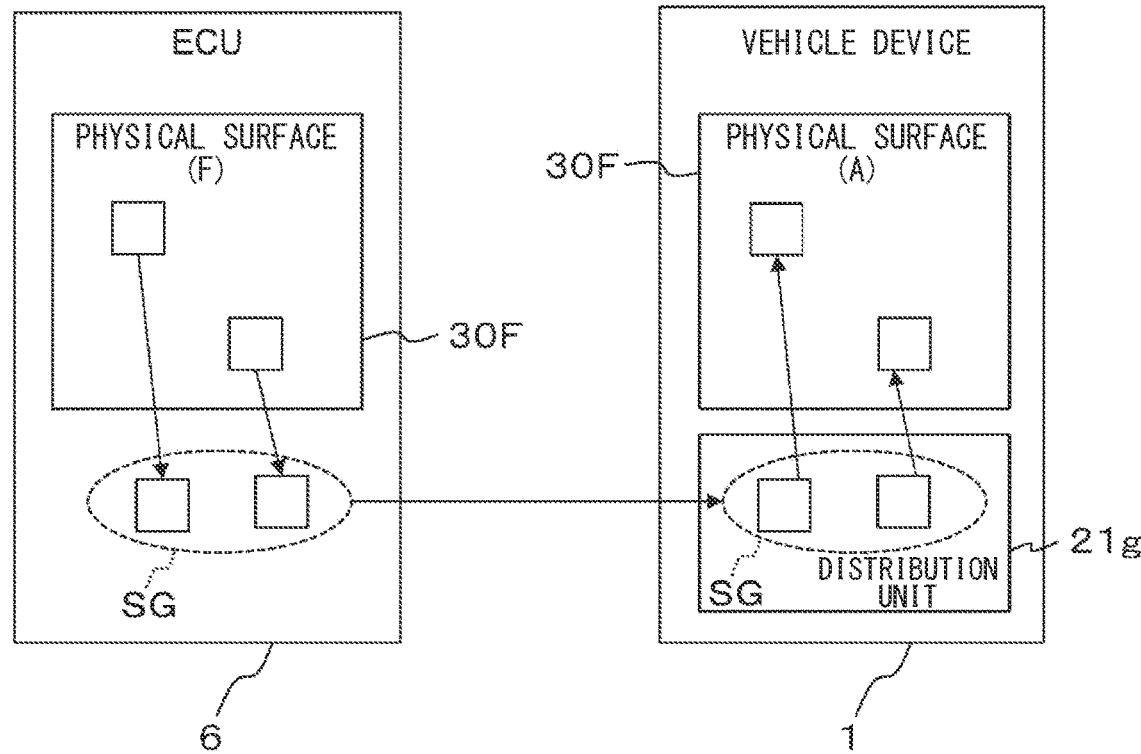
FIG. 15 is a second diagram showing an example of how to load in surfaces.

Alternatively, as shown in FIG. 15, the vehicular device 1 can collectively load in a surface group SG in which multiple surfaces drawn on the physical surface 30F of the ECU 6 are collected at the ECU 6, and providing a distribution unit 21g as the application 21 that individually distributes the surface group SG, which is loaded in, to the physical surface 30A allocated to the meter application 21a, for example.

Accordingly, the surfaces drawn on the different physical surfaces 30 can be synchronized while simplifying the processing of loading in the surface and reducing a communication amount between the vehicular device 1 and the ECU 6. The distribution unit 21g may be implemented by hardware.

Although the present disclosure has been described in accordance with the examples, it is understood that the present disclosure is not limited to the above examples or structures. The present disclosure also includes various modifications and modifications within an equivalent range. In addition, various combinations and forms, and further, other combinations and forms including only one element, or more or less than these elements are also within the sprit and the scope of the present disclosure.

The control unit and method described in the present disclosure may be implemented by a dedicated computer which is configured with a memory and a processor programmed to execute one or more particular functions embodied in computer programs of the memory. Alternatively, the control unit and the method according to the present disclosure may be achieved by a dedicated computer which is configured with a processor with one or more dedicated hardware logic circuits. Alternatively, the control unit and the method according to the present disclosure may be achieved using one or more dedicated computers which is configured by a combination of a processor and a memory programmed to execute one or more functions and a processor with one or more hardware logic circuits. Further, the computer program may store a computer-readable non-transitional tangible recording medium as an instruction to be performed by the computer.

What is claimed is:

1. A vehicular device capable of providing a plurality of contents generated by a plurality of application programs different from each other with one user interface, comprising:
   a synchronization unit configured to synchronize a plurality of surfaces individually drawn on a plurality of physical surfaces different from each other by the plurality of application programs, respectively; and
   a physical surface that is one the plurality of physical surfaces and allocated to the synchronization unit, wherein
   the synchronization unit is configured to load in one of the plurality of surfaces drawn on a different physical surface that is one of the plurality of physical surfaces and is different from the physical surface allocated to the synchronization unit, and synchronize the surface drawn by the synchronization unit and the surface drawn on the different physical surface by processing the surface that is loaded in as the surface drawn by the synchronization unit;
   the plurality of physical surfaces includes a first physical surface and a second physical surface;
   the plurality of application programs includes a first application program configured to draw a surface on the first physical surface and a second application program configured to draw a surface on the second physical surface; and
   the synchronziation unit is implemented as the first application program and is configured to:
      load the surface drawn on the second physical surface by the second application program in the first application program; and
      synchronize the surface drawn by the first application program and the surface drawn by the second application program by processing the surface that is loaded in as the surface drawn by the first application program, and redrawing the surface that is loaded in and processed on the first physical surface.

2. The vehicular device according to claim 1, wherein the plurality of application programs for drawing the plurality of surfaces is executed in the vehicular device.

3. The vehicular device according to claim 1, wherein at least one of the plurality of contents is subjected to an animation operation.

4. The vehicular device according to claim 1, wherein a plurality of operating systems is executed in the vehicular device, and
the synchronization unit is configured to synchronize the surface provided for one of the plurality of operating systems and drawn by the synchronization unit and the surface drawn on the different physical surface provided for a different one of the plurality of operating systems.

5. The vehicular device according to claim 1, further comprising
a plurality of central processing unit (CPU) modules, wherein
the synchronization unit is configured to synchronize the surface provided for one of the plurality of CPU modules and drawn by the synchronization unit and the surface drawn on the different physical surface provided for a different one of the plurality of CPU modules.

6. The vehicular device according to claim 1, wherein the vehicular device is to be communicatively connected to an external device, and
the synchronization unit is configured to synchronize the surface drawn by the synchronization unit and the surface drawn on the different physical surface provided for the external device.

7. The vehicular device according to claim 1, wherein the synchronization unit is configured to draw the surface relatively requiring real-time property compared with the surface drawn on the different physical surface.

8. The vehicular device according to claim 1, wherein the synchronization unit is configured to load in the plurality of surfaces drawn on the different physical surface.

9. The vehicular device according to claim 1, further comprising
a distribution unit configured to collectively load in the plurality of surfaces drawn on the different physical surface as a surface group and distribute the plurality of surfaces included in the surface group to individual surfaces.

10. A control method for a vehicular device capable of providing a plurality of contents generated by a plurality of application programs different from each other by one user interface, comprising:

loading in a surface drawn on a different physical surface that is different from a physical surface allocated to a synchronization unit, the surface drawn on the different physical surface being one of a plurality of surfaces individually drawn on a plurality of physical surfaces different from each other by the plurality of application programs, respectively; and synchronizing a surface drawn by the synchronization unit and the surface drawn on the different physical surface by processing the surface that is loaded in as the surface drawn by the synchronization unit;

wherein:

the plurality of physical surfaces includes a first physical surface and a second physical surface, the plurality of application programs includes a first application program configured to draw a surface on the first physical surface and a second application program configured to draw a surface on the second physical surface; and the control method further comprises:
   loading the surface drawn on the second physical surface by the second application program in the first application program; and
   synchronizing the surface drawn by the first application program and the surface drawn by the second application program by processing the surface that is loaded in as the surface drawn by the first application program, and redrawing the surface that is loaded in and processed on the first physical surface.

11. A vehicular device comprising:

a processor;

a plurality of physical surfaces including a first physical surface and a second physical surface;

a memory storing a plurality of application programs including a first application program and a second application program, wherein the plurality of physical surfaces is allocated to the plurality of application programs, respectively, and the first physical surface is allocated to the first application program, and the second physical surface is allocated to the second application program, each of the plurality of application programs is configured to, when executed by the processor, cause the processor to individually draw a surface on one of the plurality of physical surfaces that is allocated, the first application program is further configured to, when executed by the processor, cause the processor to:
   load in the surface drawn on the second physical surface by the second application program; and
   synchronize the surface drawn by the first application program and the surface drawn by second application program by processing the surface that is loaded in as the surface drawn by the first application program, and redrawing the surface that is loaded in and processed on the first physical surface.

* * * * *